United States Patent [19]

Fennell, Jr. et al.

[11] Patent Number: 5,695,400

[45] Date of Patent: Dec. 9, 1997

[54] METHOD OF MANAGING MULTI-PLAYER GAME PLAYING OVER A NETWORK

[75] Inventors: W. Temple W. Fennell, Jr., Charlottesville, Va.; Todd Hodes, Berkeley, Calif.; Scott Witherell, Woodbridge, Va.; Chris J. Goebel, Charlottesville, Va.; Rajesh P. Thakkar, Charlottesville, Va.; Thomas Schwenk, Charlottesville, Va.

[73] Assignee: Boxer Jam Productions, Charlottesville, Va.

[21] Appl. No.: 593,581

[22] Filed: Jan. 30, 1996

[51] Int. Cl.$^6$ .................................................. H04B 10/00
[52] U.S. Cl. .................................................. 463/42
[58] Field of Search .................................. 463/40, 41, 42, 463/43; 273/348, 138.1, 274, 460; 364/411, 412; 377/5

[56] References Cited

U.S. PATENT DOCUMENTS

| | | | |
|---|---|---|---|
| 4,445,187 | 4/1984 | Best | 364/521 |
| 4,569,026 | 2/1986 | Best | 364/521 |
| 4,781,377 | 11/1988 | McVean et al. | 273/86 |
| 5,035,422 | 7/1991 | Berman | 273/439 |
| 5,088,739 | 2/1992 | Mitchell | 273/248 |
| 5,108,115 | 4/1992 | Berman et al. | 273/439 |
| 5,213,337 | 5/1993 | Sherman | 273/439 |
| 5,297,802 | 3/1994 | Pocock et al. | 273/439 |

*Primary Examiner*—George Manuel
*Attorney, Agent, or Firm*—Arnold, White & Durkee

[57] ABSTRACT

A method of managing user inputs and displaying outputs in a multi-player game that is played on a plurality of terminals on a network in a manner that compensates for differences in network latency among different terminals. The method includes: (a) transmitting a representation of a game challenge such as a trivia question to the terminals via the network; (b) receiving a game response signal such as a "buzz-in" from two or more of the terminals; (c) assigning each responding terminal a priority rank according to a characteristic of their respective game response signal, e.g., elapsed time since receipt of the game challenge; (d) determining which responding terminal has the highest rank; and (e) sending signals to the responding terminals assigning them respective degrees of control of the game, e.g., the right to take a turn, in accordance with their respective ranks.

25 Claims, 4 Drawing Sheets

1

METHOD OF MANAGING MULTI-PLAYER GAME PLAYING OVER A NETWORK

BACKGROUND OF THE INVENTION

This invention relates in general to computer gaming. More particularly this invention relates to a method for managing user inputs and displaying outputs in a multi-player computer game.

Free-for-All Games

The public in the United States and other countries has enjoyed watching game shows such as "JEOPARDY" for years. In many such games, contestants are presented with, e.g., a trivia question or other challenge and then compete to be the first to "buzz-in" in response. The first player to buzz-in is allowed to attempt to answer the trivia question.

Network Latency

With the widespread availability of computer networks such as America On-line, the public is no longer limited to just watching a game-show on a television; it is now possible for the public to participate in game-shows on a personal computer. A player using a personal computer or other terminal connected to a computer network can compete with players using other terminals virtually anywhere in the world that is served by the network.

In such a context, network latency becomes a problem for games of the buzz-in type. A player using a terminal connected with comparatively low delays in transmission (i.e., a low-latency network or slow modem speed) may receive a game challenge such as a trivia question as much as several seconds sooner than a player using a terminal connected comparatively high delays in transmission. The low-latency player would likewise be able to transmit a buzz-in signal more quickly than the high-latency player. This could make such a game less enjoyable and therefore less popular.

SUMMARY OF THE INVENTION

This invention relates to a method of managing user inputs and displaying outputs in a multi-player game that is played on a plurality of terminals on a network, in a manner that reduces or eliminates the effects of differences in network latency among terminals. The method includes: (a) transmitting a representation of a game challenge such as a trivia question to the terminals via the network; (b) receiving a game response signal such as a buzz-in signal from the terminals; (c) assigning each responding terminal a priority rank according to a characteristic of their respective game response signal such as the time elapsed since the terminal received the challenge; (d) determining which responding terminal has the highest rank; and (e) sending signals to the responding terminals assigning them respective degrees of control of the game, e.g., the right to take a turn, in accordance with their respective ranks.

The representation of a game challenge may be transmitted by a host computer and the players compete by attempting to first signal the host computer that the respective player has the correct answer. In such a game-show, the terminal sends a game response signal that includes a timestamp and each terminal's rank is assigned in accordance with its respective timestamp. Alternatively, in a peer-to-peer embodiment the representation of a game challenge may be transmitted by one of the terminals.

DETAILED DESCRIPTION OF SPECIFIC EMBODIMENTS

Figure 1:
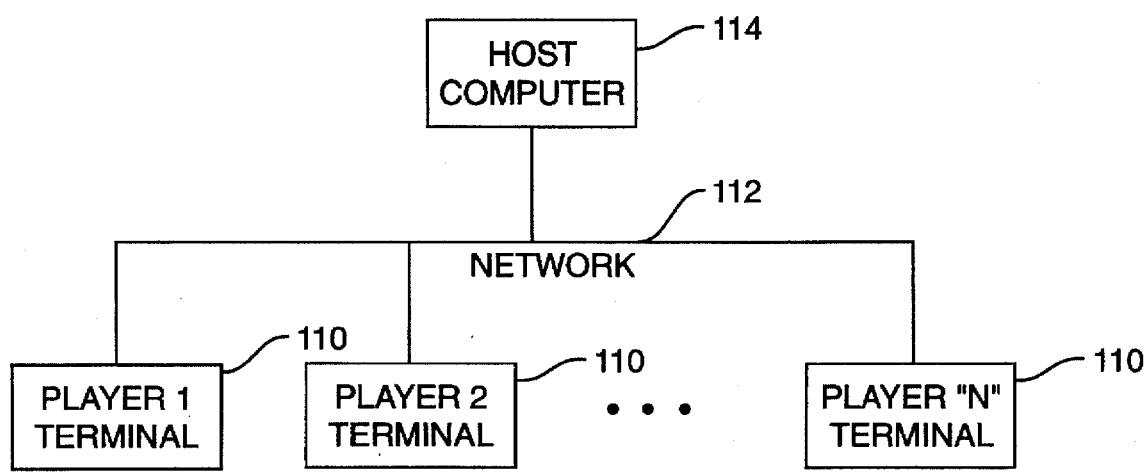
FIG. 1 is a block diagram of a host computer and a plurality of terminals connected by a network.
Figure 2:
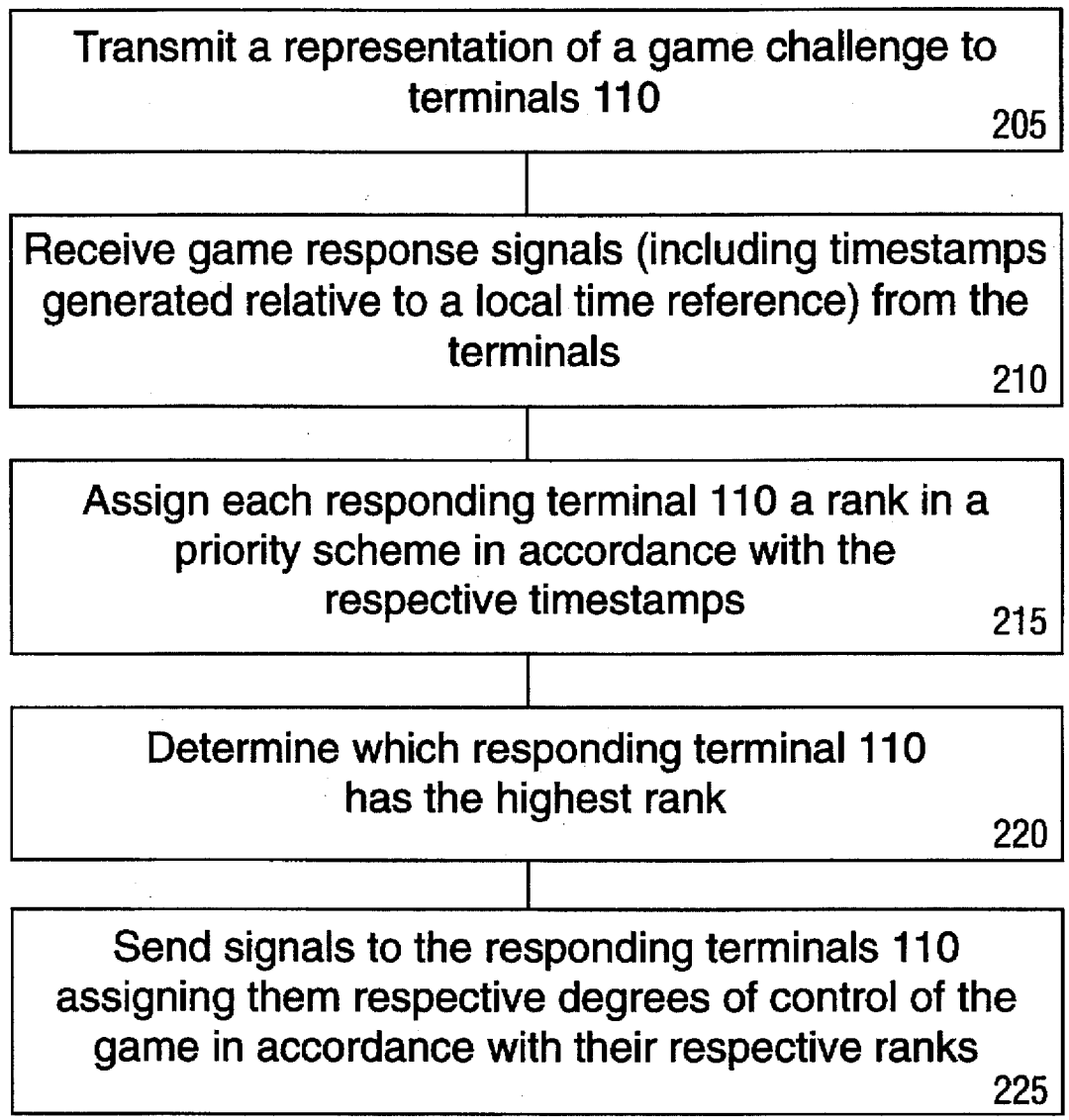
FIG. 2 is a flow diagram of one embodiment of a method of managing user inputs and displaying outputs in a free-for-all phase.

The following descriptions of illustrative embodiments of the invention are presented as lists of operations performed in illustrative methods, annotated with the explanatory notes below. The descriptions are derived from certain claims in the application as originally filed, but of course the claims are not intended and should not be deemed to be limited to the illustrative embodiments so described. Bracketed numbers correspond to the notes below, while unbracketed reference numerals correspond to identifying numerals in the drawings.

It is to be understood that the particular implementations described are intended as illustrations of, and not as limiting the scope of, the claims. In the interest of clarity, not all the routine features of the implementations are described. It will of course be appreciated that in the development of any such actual implementation, numerous implementation-specific decisions must be made to achieve the developers' specific goals such as compliance with system- and business-related constraints and that these goals will vary from one implementation to another. Moreover, it will be appreciated that such a development effort might be complex and time-consuming, but would nevertheless be a routine undertaking of engineering for those of ordinary skill having the benefit of this disclosure.

Illustrative Method

FIG. 1 shows the context of an illustrative method of managing user inputs and displaying outputs in a free-for-all phase [1] of a multi-player game [2] being played on a plurality of terminals 110 [3] connected by a network 112 [4]. The illustrative method generally comprises:

(a) transmitting a representation [6] of a game challenge [5] to the terminals via the network;

(b) receiving a game response signal [7] from one or more terminals;

(c) assigning each responding terminal a rank in a priority scheme in accordance with a characteristic of their respective game response signals; [8]

(d) determining which responding terminal has the highest rank; and (e) sending signals to the responding terminals assigning them respective degrees of control of the game in accordance with their respective ranks. [9]

Notes to Illustrative Method

[1] The free-for-all phase of a game can be understood by an illustration with reference to popular television game-shows such as "JEOPARDY." In that game, a question is asked by a host; players compete by attempting to be the first to press a buzzer. When a buzzer is pressed, that player's status board lights up and other players' buzzers are locked out. The successful player is then permitted to take a turn. Following this turn, the game returns to the free-for-all phase.

[2] The term "multi-player game" means a game in which players are competing against each other.

[3] The term "terminal" refers to any suitable input/output device such as an appropriately programmed computer with a keyboard and display; a personal digital assistant (PDA) with a touchscreen; a telephone with a keypad and a receiver; a teletype; a television with a remote control (the well-known "set-top box" concept) and the like. See FIG. 1, depicting terminals 110. Such terminals are well known in the art and consequently are not further described here. A terminal 110 may be a dedicated device with programming permanently "burned into" a read-only memory (ROM), a smart terminal such as a World Wide Web browser with software "applets" (written in, e.g., Sun Microsystems' Java language) downloaded on demand, or a general-purpose computing device with suitable game programming that is conventionally loaded from a hard disk, CD-ROM, network server, or other mass storage device when the game is to be played. It is anticipated that in many embodiments the terminals 110 will take the latter form because of the ease and low marginal cost of distributing software for controlling, e.g., a Windows-based computer.

[4] The term "network" includes local area networks, wide area networks, the Internet, cable television systems, telephone systems, wireless telecommunications systems, fiber optic networks, ATM networks, frame relay networks, satellite communications systems, and the like. See FIG. 1, depicting a network 112. Such networks are likewise well known in the art and consequently are not further described here.

[5] The game challenge may be, e.g., a question (or, as in JEOPARDY, an answer); a visually displayable puzzle; notes of a melody (as in "Name That Tune"); fragments of a quotation requiring players to answer with the complete quotation; or some other audio or visual stimulus. The game challenge may be transmitted in conventional fashion by a suitably programmed host computer 114 of a kind well known in the art. The selection and programming of the host computer 114 and the establishment of a suitable telecommunications connection to the network 112 is a matter of routine for the skilled artisan. Alternatively, the game challenge may be transmitted in conventional fashion from one player's terminal 110.

[6] The representation of the game challenge transmitted to the terminals 110 over the network 112 may be audible or visual or both. It will be apparent to those of ordinary skill that as virtual reality technologies become more highly developed, the representation of the challenge may include tactile stimuli, scents, or tastes.

[7] The response transmitted from the terminal(s) 110 over the network 112 may be akin to a "buzz" in a JEOPARDY-style game. Generally speaking, the response is generated when a competitor at a terminal actuates a transducer of some kind, whereupon the terminal 110 sends an appropriate signal over the network 112 in conventional fashion. For example, the response may be generated by pressing a button on a handheld controller; pressing a key on a keyboard; clicking on a mouse button; pressing a touch screen; making a sound to actuate a soundactivated command processor (e.g., saying a word or phrase, letting out a scream, banging on a desk); and the like. The responses may be transmitted to the host computer 114 or to a dealer's terminal 110. See also note 12.

[8] The rank assigned to each responding terminal 110 may be, for example, in accordance with a race principle. That is, the first terminal to respond is assigned the highest rank, the second terminal to respond is assigned the second-highest rank, and so forth. Ties between any given number of terminals can be resolved by randomly assigning ranks to the tied terminals. Other approaches to assigning rank are well known. For example, rank may be assigned by a competitive auction (as in, "I can name that tone in 4 seconds").

[9] In one embodiment, only two ranks and two corresponding degrees of control are assigned: The winning responding terminal gets control of the game for a stated period (e.g., until the user of that terminal takes a turn or a timeout expires, whichever occurs first), while all losing responding terminals lose control until the game returns to free-for-all mode. The signals that are sent to the responding terminals encode one of two messages, which may be paraphrased respectively as "[This terminal] has control" and "[This terminal] is locked out."

The degrees of control assigned need not be all-or-nothing; in other embodiments, varying degrees of control can be assigned to different terminals. A basketball analogy to all-or nothing degrees of control would be a free throw situation, in which a player who is fouled gets the right to attempt to shoot the ball into the basket from the free-throw line without interference from any other player. An analogy to varying degrees of control is when basketball play resumes after the free throw(s), in which one team may have the ball, but the other team is free to attempt to steal the ball, seize a rebound, or intercept a pass, i.e., it is free to exercise lower degrees of control over the ball.

Possible Variations on the Illustrative Method

The determination of which terminal was the first to respond may be easily made if each response includes a timestamp indicating the time at which the response was made. This may be accomplished by programming the terminals 110 to include such a timestamp in their responses. Each terminal's rank may then be assigned in accordance with its respective timestamp. A "start" signal may be sent to each terminal 110 by the host computer 114 or one or more of the terminals, to denote the beginning of the free-for-all phase, i.e., the phase during which users compete to be the first to respond. The timestamps in the responses generated by the terminals are determined relative to a local event such as playing of animations, sound, morphing, etc. Alternatively, the time stamps could be relative to local time references in the respective terminals. For example, the timestamp generated by a particular terminal may be expressed in terms of the length of time elapsed between the terminal's receipt of the "start" signal and the terminal user's initiation of the response. This helps level the playing field, so to speak, by reducing the advantage enjoyed by players having low network latency (i.e., comparatively short network delays). Alternatively, if network latency is low for all players, a global time reference, e.g., one maintained by a central game server, may be used for the timestamps.

The "start" signal may be broadcast by (1) a centralized host; (2) one or more of the terminals to one or more of the other terminals; or (3) each of the terminals with an average computed by a host or by each terminal. Alternatively the "start" signal may be self-generated by each terminal with each terminal administering and resolving the buzzes themselves. Still another alternative would be a "token" passing scheme in which each terminal has a fixed amount of time to register a buzz.

Figure 3:
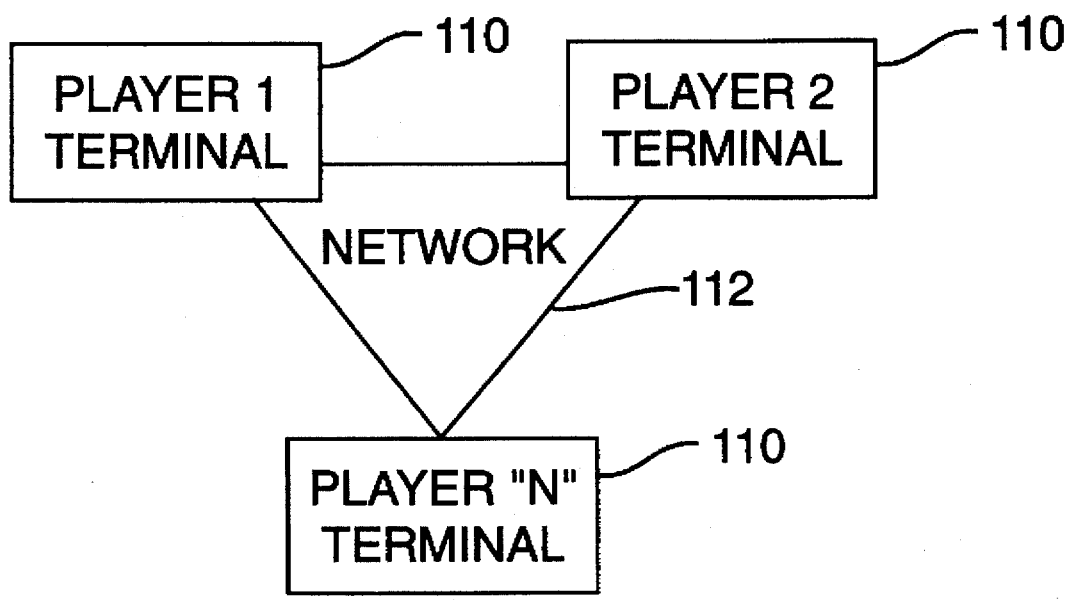
FIG. 3 is a flow diagram of an alternative embodiment of a method of managing user inputs and displaying outputs in a free-for-all phase.
Figure 4:
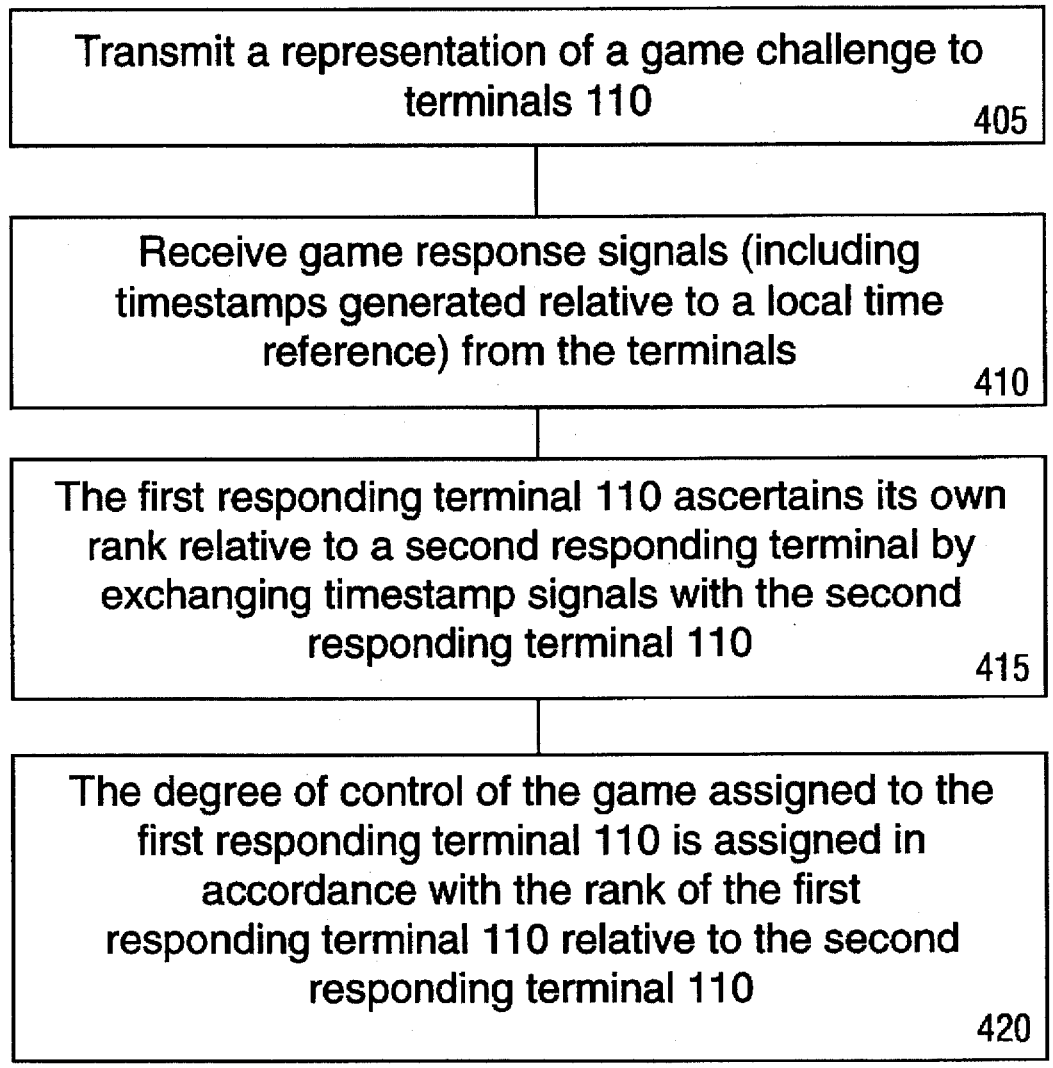
FIG. 4 is a is a block diagram of plurality of terminals connected by a network.

In a peer-to-peer embodiment, the determination of responding-terminal rankings need not be made by a central game server such as the host computer 114. Instead, in such an embodiment each terminal may be programmed to coordinate with the terminals of other users to determine its own ranking. See FIG. 3. For example, different responding terminals can exchange and compare timestamped response signals; the terminal with the lower-ranking timestamp assigns itself the lower rank as between the two, while the terminal with the higher timestamp assigns itself the higher rank. These comparisons may be carried out on a pairwise basis or alternatively on a grouped basis. An overall ranking is thus obtained as a result of a series of comparisons between each responding terminal and each other responding terminal. See FIG. 4. In such an embodiment, the winning terminal may issue an "I won" signal indicating that its user has won the free-for-all phase and is taking a specified degree of control of the game as described in note 9. This information, received by the other terminals, may be displayed to the respective users of the other terminals.

When one or more players uses a high-latency network connection, players may periodically find themselves in a wait state awaiting other players' responses. To prevent player restlessness or other dissatisfaction, interim messages such as brief cartoons, interesting facts, advertisements, and the like may be displayed for players in such a wait state. Interim messages may be transmitted over the network 112 in real time during such a wait state. Alternatively, one or more interim messages may be pre-positioned at the terminals 110 by downloading them "in the background" over the network 112 during game play, so that only a brief display interim message signal need be transmitted. This display-interim-message signal could include an identifier specifying which pre-positioned message to display. This would result in a quick display of an interim message. Conventional network-latency measurement techniques (e.g., transmitting a series of timestamped "pings" and noting the time of the resulting responses) may be used to determine the latencies of different players' connections.

It will be appreciated by those of ordinary skill having the benefit of this disclosure that in some embodiments, the terminals 110 may be programmed so that one of the terminals 110 transmits the game challenges. Such embodiments would permit players to manage their own games without the need for active management by the host computer 114. For example, in a trivia game, at the beginning of the game the host computer 114 may download an encrypted question-and-answer file to the terminal 110 of a particular player (e.g., a player who initiates the game by issuing an electronic-mail or "chat" challenge to other players). This player at this terminal may issue a game challenge by pressing an appropriate function key on his or her terminal 110, whereupon that player's terminal 110 both transmits the game challenge over the network 112 to the other terminals and displays the game challenge.

In another embodiment, network responsiveness as perceived by players may be improved by pre-positioning the text and/or graphics for a series of one or more game challenges at the terminals 110 by transmitting them to the terminals at the beginning of a game. The pre-positioned game challenges could be compressed to speed transmission. Further, pre-positioned game challenges could be encrypted to prevent the players from discerning the challenges in advance. The transmission may be effected "in the background" during a player sign-up phase, possibly accompanied by display of an interim message such as instructions for playing the game. In such an embodiment, once the series of game challenges has been pre-positioned, an individual game challenge can be displayed by simply transmitting a comparatively brief signal requesting that the terminals 110 display a particular game challenge in the series (e.g., a signal encoding a command such as "display challenge number 3A" or "display the next challenge"). This embodiment may require additional game-management routines to ensure that all players are in fact presented with the same game challenge. Such routines will be readily implemented by those of ordinary skill having the benefit of this disclosure.

In a variation on the embodiment described above, game challenges may be pre-positioned at the terminals 110 on close to a just-in-time basis. For example, a game challenge such as a trivia question for an upcoming free-for-all phase in a trivia game (and perhaps the answer to the question as well) may be transmitted to the terminals 110 in background while the players are playing a previous phase of the game, e.g., while the players are transmitting response signals for a previous game challenge or while one player is taking a turn. This helps improve responsiveness as perceived by players while avoiding the undesirable delays attendant to down-loading a large number of game challenges at the beginning of a game.

Packetized audio transmission, such as those beginning to gain popularity on the Internet, may be used in conjunction with the game challenge signal, the game response signal, or both. For example a game challenge signal that includes a text- or text-and-graphics representation of a trivia question may also include a digitized audio representation of the trivia question being read aloud; background music; and so forth. The digitized audio representation may be "canned," e.g., in the form of a conventional .WAV file playable on computers having suitable sound-card equipment of the kind well known in the art. The canned audio representation may be stored in a data store in association with, and downloaded to the terminals with, the text- or text-and-graphics representation of the trivia question. Alternatively, a "host" of the game (e.g., one of the players or a moderator at the host computer 114) may read the trivia question into a microphone (not shown), with the signal generated by the microphone being conventionally digitized and transmitted to the terminals. This type of audio transmission is commonly known as audio streaming. In another embodiment, players whose terminals are equipped with suitable microphones and sound-card equipment may "chat" in close to real time, much as though they were playing together in the same room.

Program Storage Device

Any of the foregoing variations may be implemented by programming a suitable general-purpose computer that has the requisite network connections. The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

It will be appreciated by those of ordinary skill having the benefit of this disclosure that numerous variations from the illustrations in the notes will be possible without departing from the inventive concept described herein.

What is claimed is:

1. A method of managing user inputs and displaying outputs in a free-for-all phase of a multi-player game being played on a plurality of terminals connected by a network, said method comprising:
   (a) transmitting a representation of a game challenge to the terminals via the network;
   (b) receiving a game response signal from one or more terminals;
   (c) assigning each responding terminal a rank in a priority scheme in accordance with a characteristic of their respective game response signals;
   (d) determining which responding terminal has the highest rank; and
   (e) sending signals to the responding terminals assigning them respective degrees of control of the game in accordance with their respective ranks.

2. The method of claim 1, wherein the method is performed by a host computer.

3. The method of claim 1, wherein (1) each game response signal includes a timestamp, and (2) each terminal's rank is assigned in accordance with its respective timestamp.

4. The method of claim 1, wherein each terminal's timestamp is generated relative to a local event.

5. The method of claim 1, wherein each terminal's timestamp is generated relative to a global event.

6. The method of claim 1, wherein each terminal's timestamp is generated relative to a local time reference.

7. The method of claim 1, wherein each terminal's timestamp is generated relative to a global time reference.

8. The method of claim 1, wherein:
   (1) a first responding terminal ascertains its own rank, relative to a second responding terminal, by exchanging timestamp signals with the second responding terminal, and
   (2) the degree of control of the game assigned to the first responding terminal is assigned in accordance with the rank of the first responding terminal relative to the second responding terminal.

9. The method of claim 8, wherein the degree of control of the game assigned to the first responding terminal is assigned by the first responding terminal.

10. The method of claim 8, wherein a winning terminal transmits a signal indicating that its user has won the free-for-all phase of the game.

11. The method of claim 1:
   (1) wherein a first terminal has a higher degree of network latency than a second terminal, and
   (2) further comprising displaying a message at the second terminal during the determination of which responding terminal has the highest rank.

12. The method of claim 1, wherein the representation of a game challenge is transmitted by a host computer.

13. The method of claim 1, wherein the representation of a game challenge is transmitted by one of the terminals.

14. The method of claim 13, wherein (1) a plurality of respective representations of game challenges is transmitted to the terminals prior to the free-for-all phase, and (2) during the free-for-all phase, a representation of a specified game challenge is displayed at the terminals.

15. The method of claim 13, wherein a representation of a game challenge for the free-for-all phase in the game is transmitted prior to the beginning of that phase and subsequent to a previous free-for-all phase.

16. The method of claim 1, wherein the representation of a game challenge is generated locally at each terminal.

17. The method of claim 1, wherein the game challenge is a transmission of a packetized video signal.

18. A method of managing user inputs and displaying outputs in a free-for-all phase of a multi-player game being played by a first terminal and a plurality of terminals connected by a network, said method comprising:
   (a) the first terminal transmitting a representation of a game challenge to the plurality of terminals via the network;
   (b) each other terminal assigning itself a rank in a priority scheme in accordance with a characteristic of its respective game response signal; and
   (c) a winning terminal sending signals to the other terminals indicating that it has assumed a specified degree of control of the game in accordance with its rank.

19. The method of claim 18, wherein:
   (1) each game response signal includes a timestamp; and
   (2) each terminal's rank is assigned in accordance with its respective timestamp.

20. The method of claim 18, wherein each terminal's timestamp is generated relative to a local event.

21. The method of claim 18, wherein each terminal's timestamp is generated relative to a global event.

22. The method of claim 18, wherein each terminal's timestamp is generated relative to a local time reference.

23. The method of claim 18, wherein each terminal's timestamp is generated relative to a global time reference.

24. A method, executed by a host computer, of managing user inputs and displaying outputs in a free-for-all phase of a multi-player game being played on a plurality of terminals connected to the host computer by a network, said method comprising:
   (a) transmitting a representation of a game challenge to the terminals via the network, said representation including a digitized video signal;
   (b) receiving respective game response signals from one or more terminals, each game response signal including a timestamp;
   (c) assigning each responding terminal a rank in a priority scheme in accordance with its respective timestamp;
   (d) determining which responding terminal has the highest rank, referred to as the winning terminal, by comparing the timestamps of the responding terminals;
   (e) sending a signal to the winning terminal giving it control of the game; and
   (f) sending signals to the other responding terminals locking them out of control of the game.

25. A storage device for storing the machine readable instructions for implementing any one of the methods in claims 1 through 24.

* * * * *